US00RE35799E

United States Patent [19]

Sonehara et al.

[11] E Patent Number: Re. 35,799

[45] Reissued Date of Patent: May 19, 1998

[54] REFLECTION-TYPE LIQUID CRYSTAL DEVICE WITH POLARIZATION OF OUTPUT LIGHT PERPENDICULAR TO THAT OF INPUT LIGHT

[75] Inventors: Tomio Sonehara; Osamu Okumura, both of Suwa, Japan

[73] Assignee: Seiko Epson Corporation, Tokyo, Japan

[21] Appl. No.: 729,929

[22] Filed: Oct. 15, 1996

Related U.S. Patent Documents

Reissue of:

[64] Patent No.: 5,361,151
Issued: Nov. 1, 1994
Appl. No.: 113,827
Filed: Oct. 7, 1993

U.S. Applications:

[63] Continuation of Ser. No. 739,961, Aug. 5, 1991, abandoned.

[30] Foreign Application Priority Data

Aug. 9, 1990 [JP] Japan ..... 2-210813
Sep. 6, 1990 [JP] Japan ..... 2-236455

[51] Int. Cl.[6] ..... G02F 1/1335; G02F 1/13

[52] U.S. Cl. ..... 349/98; 349/99; 349/117; 349/180; 349/181

[58] Field of Search ..... 349/98, 99, 117, 349/180, 181

[56] References Cited

U.S. PATENT DOCUMENTS

| | | | |
|---|---|---|---|
| 3,960,438 | 6/1976 | Bonne et al. | 349/96 |
| 3,972,587 | 8/1976 | Scheffer | 349/180 |
| 4,019,807 | 4/1977 | Boswell et al. | 359/72 |
| 4,232,948 | 11/1980 | Shanks | 359/73 |
| 4,844,569 | 7/1989 | Wada et al. | 359/63 |
| 4,889,412 | 12/1989 | Clerc et al. | 359/63 |
| 5,105,289 | 4/1992 | Sonehara et al. | 359/63 |
| 5,212,819 | 5/1993 | Wada | 359/63 |

FOREIGN PATENT DOCUMENTS

| | | | |
|---|---|---|---|
| 0 352 724 | 1/1990 | European Pat. Off. . | |
| 0 377 757 | 7/1990 | European Pat. Off. . | |
| 2177352 | 11/1973 | France | 359/65 |
| 2 238 200 | 2/1975 | France . | |
| 56-43681 | 4/1981 | Japan . | |
| 56-43781 | 4/1981 | Japan . | |
| 1-88828 | 7/1989 | Japan . | |
| 1 469 638 | 4/1977 | United Kingdom . | |
| WO 91/06889 | 5/1991 | WIPO . | |

OTHER PUBLICATIONS

Minoru Hosokawa et al., "Active Panel Having Wide View Angle Employing Guest Host Type Liquid Crystal", Nikkei Electronics, Feb. 16, 1981, pp. 164–184.

G. Paul Montgomery, Jr., "Optical properties of a liquid--crystal image transducer at normal incidence: Mathematical analysis and application to the off-state," J. Opt. Soc. Am., vol. 70, No. 3, Mar.1980, pp. 287–300.

Tomio Sonehara et al., "A New Twisted Nematic ECB (TN-ECB) Mode for a Reflective Light Value", JAPAN DISPLAY'89, Oct. 16, 1989, pp. 192–195.

*Primary Examiner*—Anita Pellman Gross
*Attorney, Agent, or Firm*—Mark P. Watson

[57] ABSTRACT

A reflection-type liquid crystal (LC) device having a twisted nematic (TN) LC layer that lets linearly-polarized incident light enter and become circularly-polarized at a reflecting surface, and then linearly polarizes it, after reflecting, with a plane of polarization that has been rotated 90° from the incident light at an light output surface. The TN LC layer allows linearly-polarized incident light to enter at an angle to the molecular plane of light input of the twisted nematic LC, and to linearly polarize the light after reflection. The plane of polarization is rotated 90° from the incident light at the light output surface. The TN LC layer also allows circularly-polarized incident light to enter and become linearly-polarized light at the reflecting surface. Circularly-polarized light after reflection may be rotated opposite the incident circularly-polarized light at the light output surface to provide for reverse on/off states.

15 Claims, 11 Drawing Sheets

REFLECTION-TYPE LIQUID CRYSTAL DEVICE WITH POLARIZATION OF OUTPUT LIGHT PERPENDICULAR TO THAT OF INPUT LIGHT

Matter enclosed in heavy brackets [ ] appears in the original patent but forms no part of this reissue specification; matter printed in italics indicates the additions made by reissue.

This is a continuation of copending application Ser. No. 07/739,961 filed Aug. 5, 1991, now abandoned.

BACKGROUND OF THE PRESENT INVENTION

1. Field of the Present Invention

The present invention relates generally to liquid crystal devices and specifically to reflection-type devices that have reduced double image reflections and improved performance.

2. Description of the Prior Art

Liquid crystal (LC) has the unusual physical characteristic of sharing aspects of both the liquid and solid phases at the same time. Computer and television display screens that are based on LC technology are now widely available. LC displays (LCDs) are typically flat, draw little power, have good contrast, and can be made to produce color.

Prior art reflection-type LCDs use twisted nematic (TN) liquid crystal material with an optically uniaxial opto-electric medium having a quarter wavelength plate with a twist angle of 45°. The output light is very often elliptically-polarized. For a description of such devices, see, U.S. Pat. No. 4,019,807, and Japanese Laid-Open Patent Publication 56-43681. Some prior art reflection-type LCDs use super twisted nematic (STN) mode, which is a variation on the TN mode mentioned.

In prior art reflection-type LCDs, there has been little allowable margin with respect to the thickness of an LC layer, and display performance has been inconsistent. Also, light output is reduced because it is typically elliptically-polarized. Dark and discolored displays and double images are significant problems in prior art LCDs. A liquid crystal device that solves these problems is, therefore, needed for present and future applications.

SUMMARY OF THE PRESENT INVENTION

An object of the present invention is to produce a reflection-type LC device that reduces light loss, has increased production margins, and eliminates the discoloration and double imaging problems inherent in prior art displays.

An embodiment of the present invention is a reflection-type LC device having a TN LC layer that lets linearly-polarized incident light enter and become circularly-polarized at a reflecting surface, and then linearly polarizes it, after reflecting, with a plane of polarization that has been rotated 90° from the incident light at an light output surface. The twisted nematic LC layer allows linearly-polarized incident light to enter at an angle to the molecular plane of light input of the twisted nematic LC, and to linearly polarize the light after reflection. The plane of polarization is rotated 90° from the incident light at the light output surface. The twisted nematic LC layer also allows circularly-polarized incident light to enter and become linearly-polarized light at the reflecting surface. Circularly-polarized light after reflection which has been rotated opposite the incident circularly-polarized light at the light output surface.

An advantage of the present invention is that one polarizing plate combines polarizing, analyzer, and reflecting elements.

Another advantage of the present invention is that relative roughness the surface facing the LC device of at least one of the substrates of the two substrates of the LC cell.

Another advantage of the present invention is that a reflecting element is on a surface facing the LC side of the LC cell substrate.

Another advantage of the present invention is that it has an Δnd value relatively larger than that typically found in the prior art. This makes possible wider production tolerances, with respect to how thick the LC layer must be.

Another advantage of the present invention is that a linearly-polarized light output results in reduced light losses and more visible displays.

Another advantage of the present invention is that it facilitates control of the opto-electric characteristics, so that the multiplexing performance is improved in devices with a steep characteristic and gray-scale expression is improved in devices with a moderate characteristic.

Another advantage of the present invention is that it flattens the reflection spectrum when OFF, which reduces light loss over a wide range of wavelengths and prevents discoloration.

Another advantage of the present invention is that there is no reduction of the numerical aperture depending on the means by which the picture elements are addressed, and so light loss is further reduced.

Another advantage of the present invention is that an LC display element can be offered which eliminates double images in the display.

Another advantage of the present invention is that by using a semi-transparent reflector and a backlight at the back side of the LC cell, a transmission type device can be constructed for applications with low ambient light levels.

Other objects and attainments together with a fuller understanding of the present invention will become apparent and appreciated by referring to the following description and claims taken in conjunction with the accompanying drawings.

DETAILED DESCRIPTION OF SEVERAL EMBODIMENTS OF THE PRESENT INVENTION

First Embodiment

Figure 1:
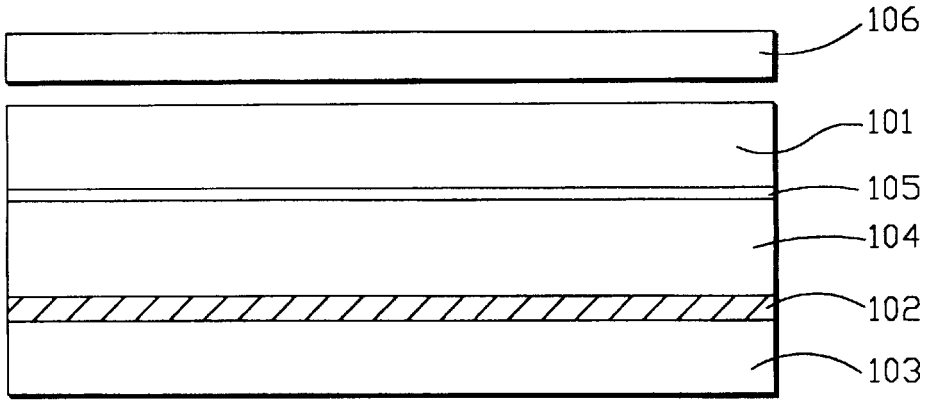
FIG. 1 is a cross section of a reflection-type LCD device, according to a first embodiment the present invention.

FIG. 1 is a cross section of a reflection-type LC device, according to a first embodiment of the present invention, which is comprised of a twisted nematic (TN) liquid crystal (LC) material 104 sandwiched between a transparent substrate 101 and an opposing substrate 103 having a reflector 102. An element 106 polarizes and analyzes any light input and output. A transparent electrode 105 puts an electric field on the LC layer. Another electrode is made from a metal thin-film and serves a second role as reflector 102, which can alternatively comprise a reflective layer separated by an insulating layer from a patterned layer, with the patterned layer at least being transparent. The light input, light output, and transparent electrode surfaces are coated with a treatment that reduces and suppresses undesirable light reflections, such as, ghosting, or double imaging.

Figure 2:
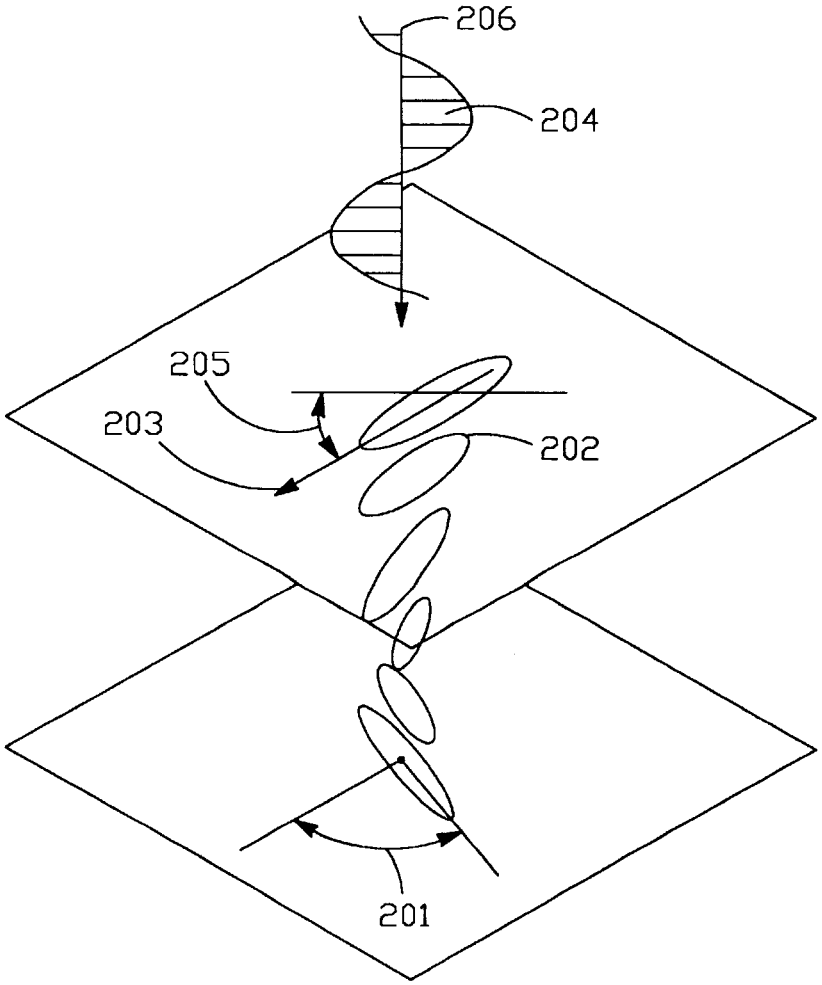
FIG. 2 is a perspective of the LC device of FIG. 1.

FIG. 2 illustrates the relative element orientations related to the LC device of FIG. 1. An incident (input) light 206, is converted to linearly-polarized light by a polarizing element. Light 206 is incident at a polarizing plate angle 205 between an LC molecule director 203 on the light input side and an electric field surface 204. A plurality of LC molecules 202 align themselves parallel to the substrate interface when the applied voltage is zero. Processing to properly orient a twist angle 201 between the upper and lower substrates comprises unidirectional rubbing, oblique evaporation, etc. (See, E. Kaneko, Liquid Crystal TV Displays, KTK Scientific Publishers [Tokyo], c. 1987, pp. 17–18.) The important device parameters for the LC cell are the twist angle 201 of the nematic LC layer, retardation Δnd, and the polarizing plate angle 205. (Where Δn is the anisotropy of the refractive index of the LC material, and d is the spacing between substrates.) The direction of rotation, as viewed from the front of the reflector, is the same and positive for all angles below.

Figure 3:
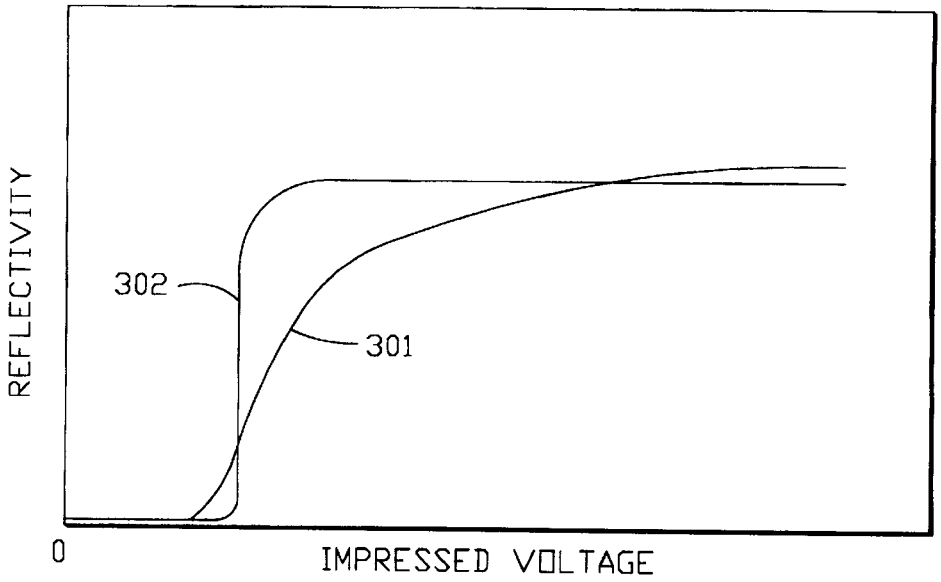
FIG. 3 is a graph of the voltage-versus-reflectivity characteristic (at 550 nanometers) for the LC device of FIG. 1.

FIG. 3 shows the relationship between the voltage and the reflectivity for the device of FIG. 1. The device has a twist angle 301 of 63°, Δnd=0.2, a polarizing plate angle of zero, a twist angle 302 of 180°, Δnd=0.56, and a polarizing plate angle of 83°. The wavelength used is 550 nanometers. (All angles and measurements are approximate.)

Figure 4:
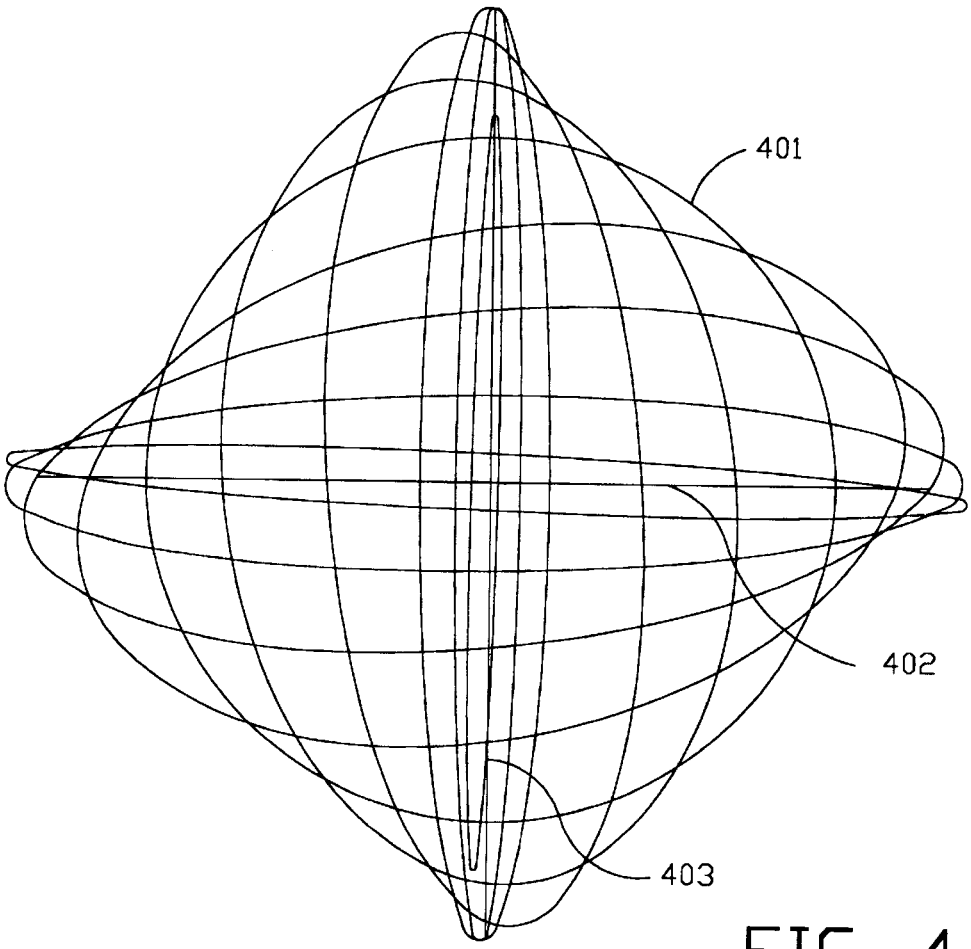
FIG. 4 is a locus diagram of elliptically-polarized light.

FIG. 4 helps explain a change in polarization of light within the LC layer. In a simplest case, the twist angle is 63°, Δnd=0.2, and the polarizing plate angle is zero. When a linearly-polarized light 402 enters and the voltage is zero, the locus of elliptically-polarized light will be rotated as shown. It becomes a nearly circularly-polarized light 401 at the reflective surface, after which it changes to an elliptically-polarized light 403, whose plane of polarization has been rotated 90° at the light output surface. In the OFF state, light is blocked at the polarizing plate, and the device reflectivity is impeded. When a voltage is applied, the LC molecules reorient in the direction of the electric field, due to the inherent dielectric constant anisotropy of the LC material. In this state, light will not double refract (be birefringent) in the LC material. Incident, linearly-polarized light keeps its polarization as it is reflected and travels back out. The locus of elliptically-polarized light changes to circularly-polarized light at the reflective surface, and to linearly-polarized light at the light output surface (which has been rotated 90° from the time of light input). The opto-electric characteristics of such a device differ from prior art modes in that, as shown in FIG. 3, the steepness of voltage-transmissivity characteristic curve can be controlled by the twist angle. This is the same effect caused by the elasticity of twisted nematic LC materials (e.g., STN LC displays). The optimum value for the polarizing plate angle appears in 90° periods. The effect of Δn acts exactly the same as when linearly-polarized light is input perpendicular to the direction of the LC material. Only certain conditions can produce this unique change in polarization. Two optical characteristics of the LC layer are required. First, the layer must change linearly-polarized light to circularly-polarized light (with respect to its light input) at the reflective surface after transmission. Second, the plane of polarization of the light must be rotated 90° as it passes through the LC layer. LC cell parameters, below, satisfy these two conditions.

Figure 5A:
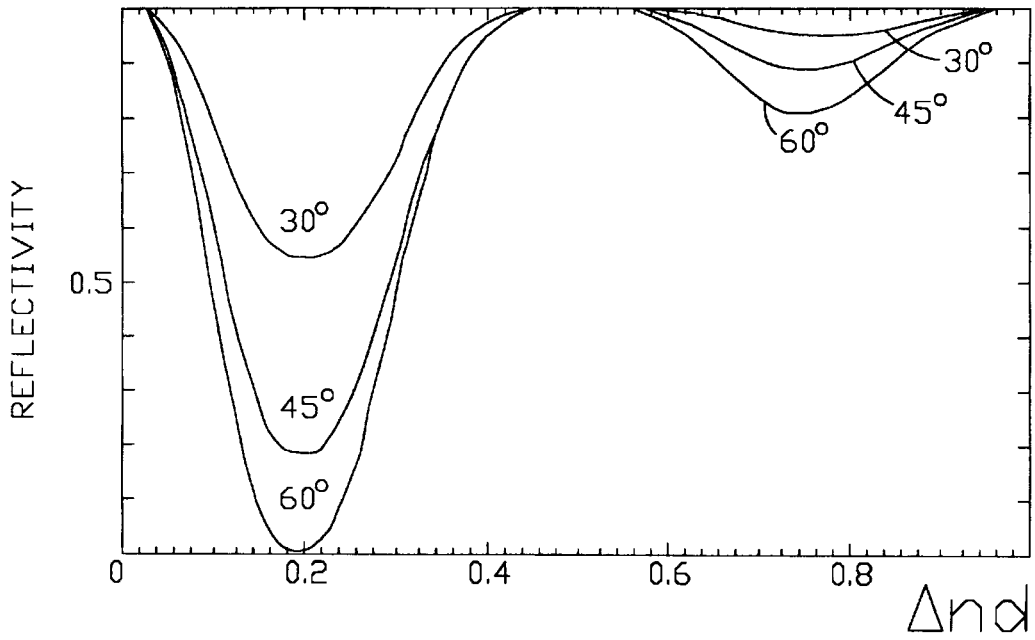
FIGS. 5A, 5B and 5C are graphs of the reflectivity when OFF-vs.-Δnd characteristic.
Figure 5B:
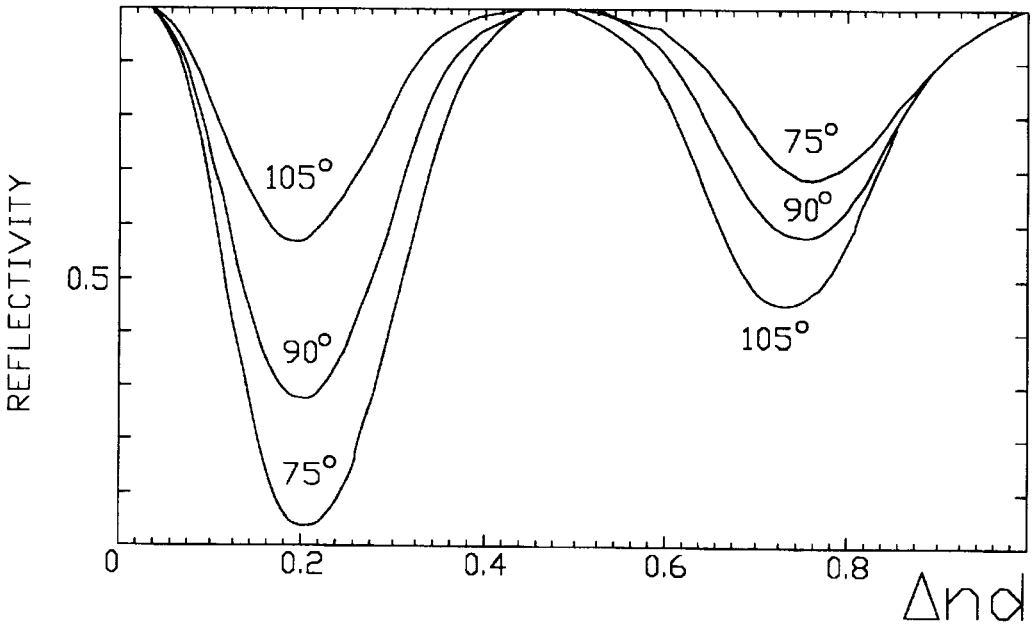
Figure 5C:
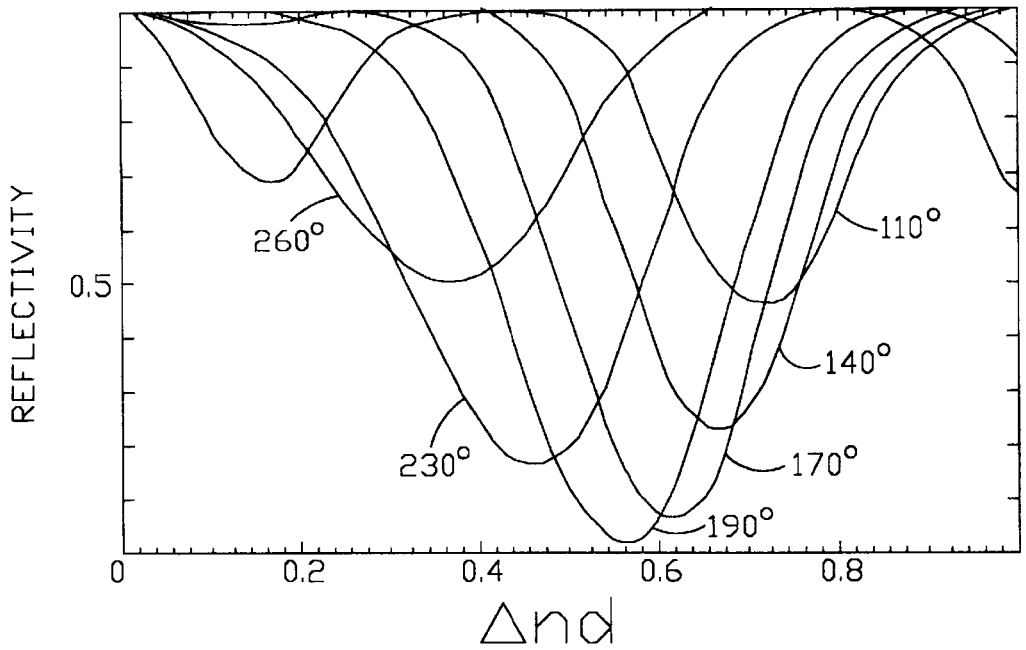

FIGS. 5A, 5B, and 5C show the relationship of Δnd versus reflectivity, when the above device is OFF, and where the twist angle is set and the polarizing plate angle is zero. The reflectivity will nearly be zero when the twist angle is approximately 60° and Δnd=0.2. A twist angle of 63° is optimal. The reflectivity when the device is ON, however, is determined by the transmissivity of the polarizing element and is nearly constant.

Figure 6A:
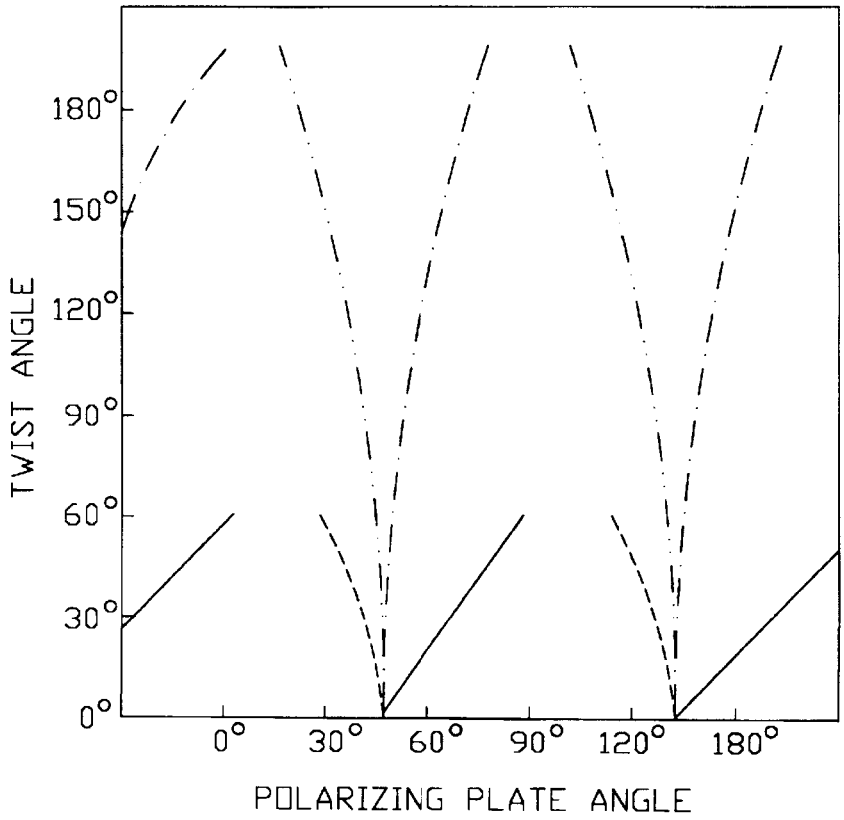
FIG. 6A is a graph showing the relationship between the polarizing plate angle and twist angle.
Figure 6B:
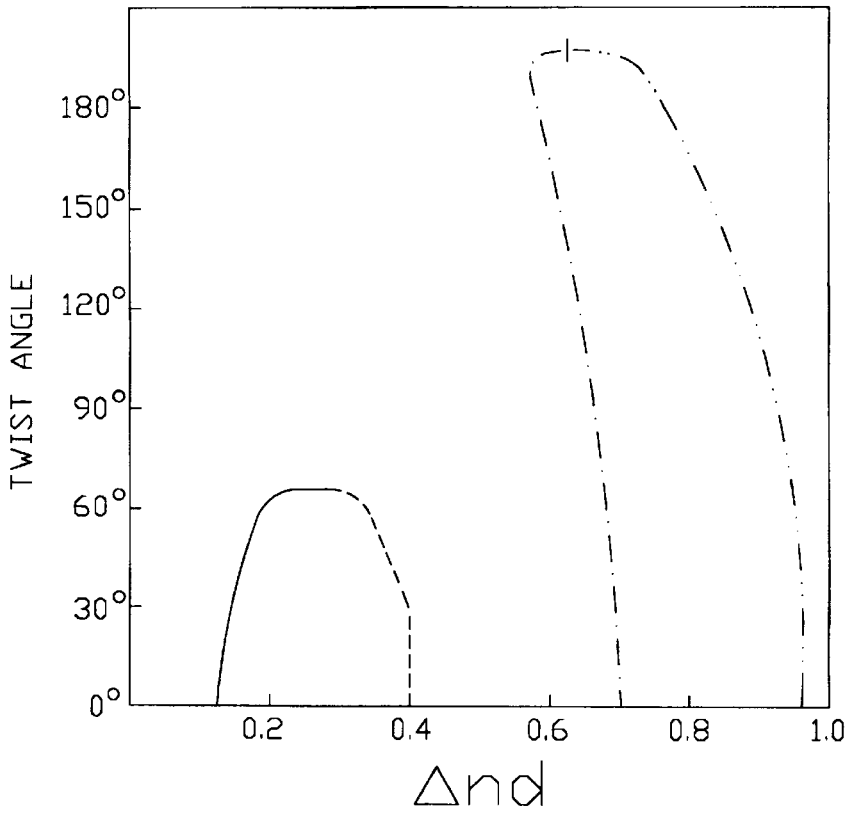
FIG. 6B is a graph of the relationship between the twist angle and Δnd.

FIG. 6A shows the relationship between polarizing plate angles and various twist angles. FIG. 6B shows a relationship between the twist angle and Δnd. The wavelength is 550 nanometers for both. The optimum values for the polarizing plate angle, Δnd and twist angle values are as above, and such that continuous state settings were possible. FIGS. 6A and 6B show the optimum conditions for monochromatic light, but in determining the actual parameters, it is necessary to trade optimum conditions to get the range of wavelengths that are to be used. An effective Δn is necessary, due to the pre-tilt angle of the LC. A twist angle range of 200° is assumed, but state settings exceeding this range are possible. A relatively large Δnd is required in this case, the change in reflectivity due to the wavelength being large, and the usable wavelength range is therefore limited. A small Δnd is needed in order to hold down a change in reflectivity caused by the wavelength chosen, but since the LC thickness becomes too thin at extremely small values of Δnd, it must be set somewhere in between these Δnd values. Acceptable LC thicknesses for transmission-type device production can be a problem in reflective-type devices, where the light must travel through the LC material twice (once in, once out). Therefore, Δnd should be slightly larger than necessary. This increases the production margins possible for the elements. When observed at the Δnd=0.2 state above, d changes to 2.5 μm (for a typical value of Δn=0.08 in an LC with a small Δn). In contrast, prior art types with a 45° twist, the optimum LC thickness is less than 2 μm, which results in reduced production uniformity and yield.

The above overall electrode types not intended to display pictures can be used, e.g., as electrically controlled glare-proof mirrors for automobiles or as optical shutters in cameras. Particularly when applied to electrically controlled glare-proof mirrors, a higher reflectivity is observed when transparent than in two-color pigment types or TN types with a polarizing plate in front and back. The threshold characteristics can be used to increase the number of multiplexed display drive lines when used in regular reflective type LC display devices that address using an XY matrix.

Second Embodiment

Figure 7:
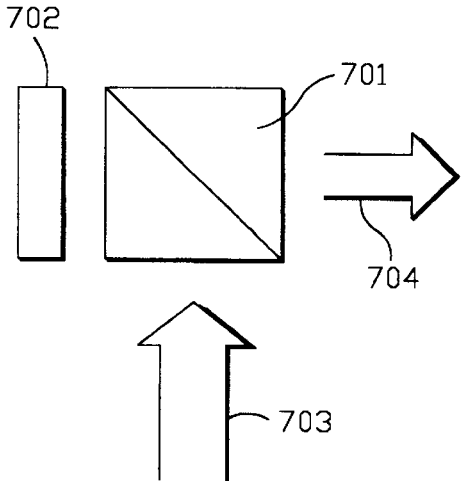
FIG. 7 is a diagram of a reflection-type LC device in which a polarizing beam splitter is used as the polarizing element.

FIG. 7 illustrates a reflection-type LC device, according to a second embodiment of the present invention, in which a polarizing beam splitter 701 is used as a polarizing element. The splitter 701 linearly polarizes a light 703 and directs it toward an LC panel 702. The operation of LC panel 702 itself is similar to that described above in the first embodiment. A means for analyzing (polarizing) the output light shifts it 90° from that of the light input. No light is reflected absent an electric field, and the voltage-versus-reflectivity characteristic changes to one that is symmetrical, with respect to the vertical axis (see FIG. 3).

Third Embodiment

Figure 8:
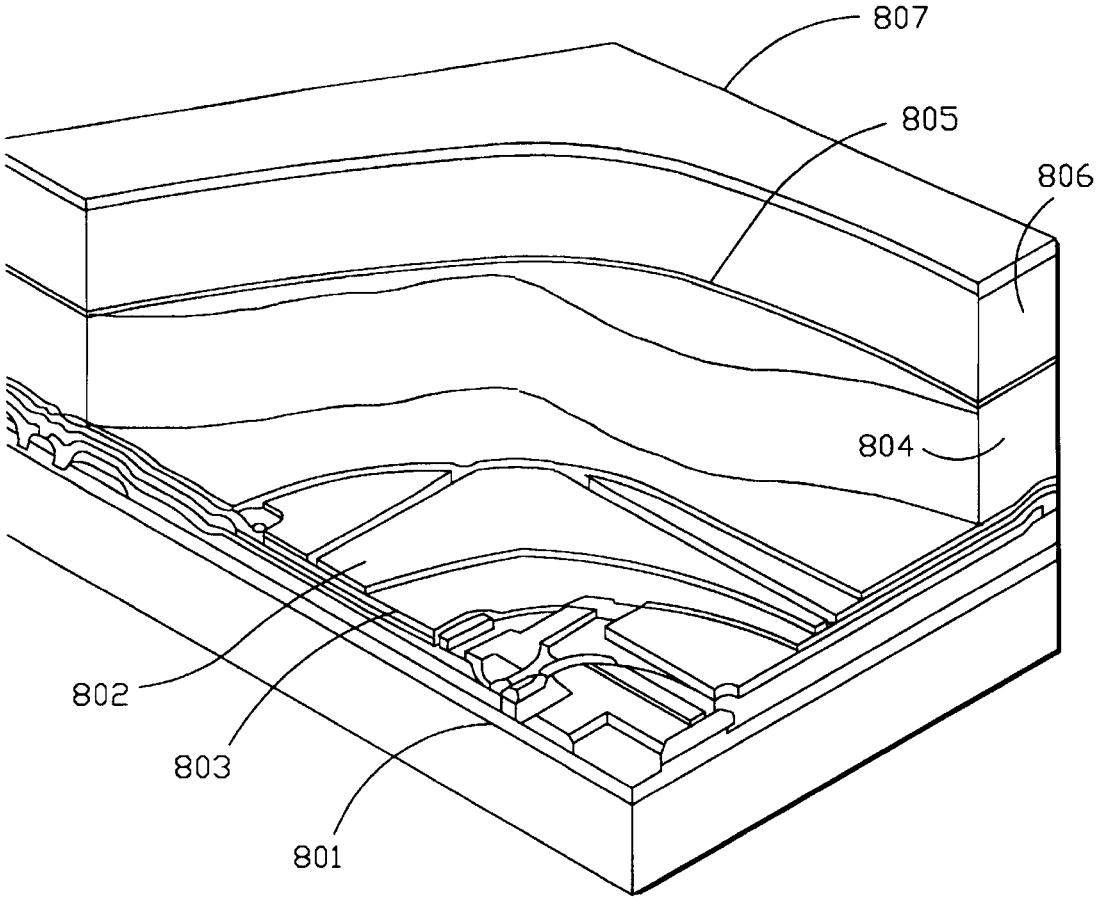
FIG. 8 is a cutaway perspective view of a cube section of a reflection-type LC device, according to a third embodiment of the present invention, that has an active matrix.

FIG. 8 is a cutaway perspective view of a three dimensional section of a reflection-type LC device, according to a third embodiment of the present invention, having an active matrix comprising a transistor 801 positioned at each picture element, an element electrode 802, an interlayer insulator layer 803, an LC layer 804, a transparent electrode 805 deposited on an opposing transparent substrate 806, and a polarizing plate 807. (For a discussion of similar devices, see, Nikkei Electronics, Feb. 16, 1981, p. 164.) This embodiment can also be implemented in active matrix devices in which TFT, diodes, etc., are arrayed.

Reflection-type displays allow the wiring and active elements of a device to be positioned under each picture element electrode. A higher picture element electrode to area ratio can be realized, regardless of the required number active elements or amount of wiring. This prevents a decrease in the active viewing area which usually results with a higher number of picture elements. The advantages achieved are a reduction in the light loss, compared to guest-host types, the display is brighter, and color images can be produced at lower light powers using color filters, since a polarizing plate and diffusion type reflector are not required on the bottom (as is typical in prior art TN type reflector LC elements). The retention volume of a thin LC layer is very much improved.

Fourth Embodiment

Figure 9:
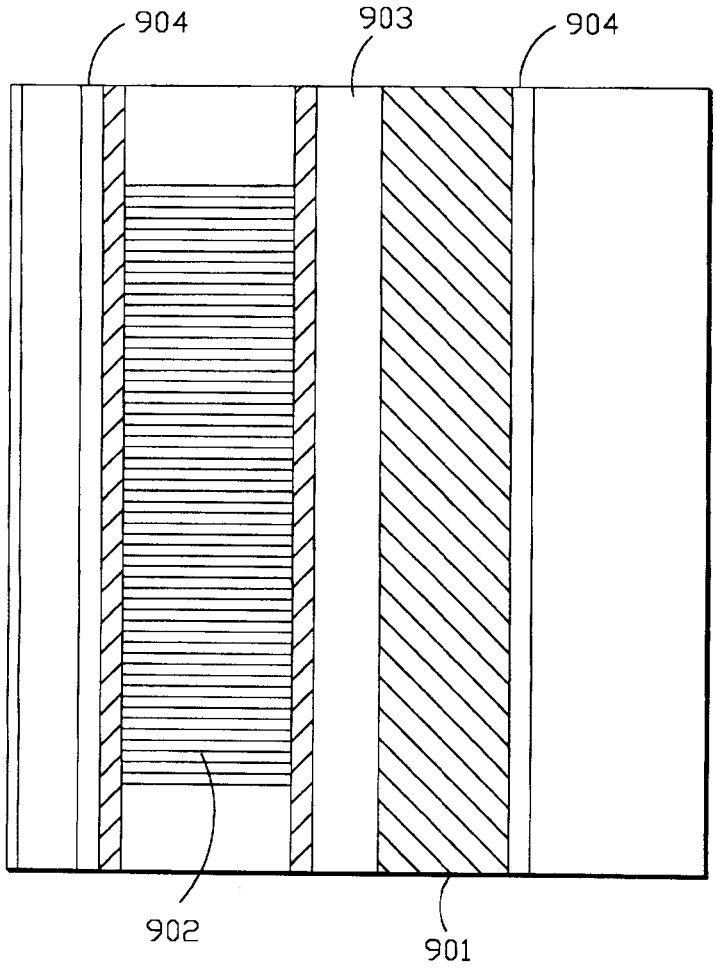
FIG. 9 is a cross section of a reflection-type device that is written with light.

FIG. 9 is a cross section of a reflection-type device, according to a fourth embodiment of the present invention. The impedance of points on a photoconductive layer 901 are changed by light exposure and that indirectly controls the pattern of an electric field that is applied to an LC layer 902. The device has a reflective mirror 904 and a transparent electrode 904. Similar devices appear in Japanese Laid-Open Patent Publication 56-43781 and in J. Opt. Soc. Am., Vol. 70, No. 3, p.287 (1980). In the present invention, $\Delta nd=0.2$ and the twist angle is approximately 60°. In the prior art, $\Delta nd$ is smaller, at 0.18, and the LC layer is usually less than 2 μm. Here, the LC layer thickness can be increased to be more than 2 μm. The maximum reflectivity in the OFF state when using a polarizing beam splitter is approximately 80%. The present invention achieves reflectivities approaching 100% in the ON state.

Fifth Embodiment

Figure 10:
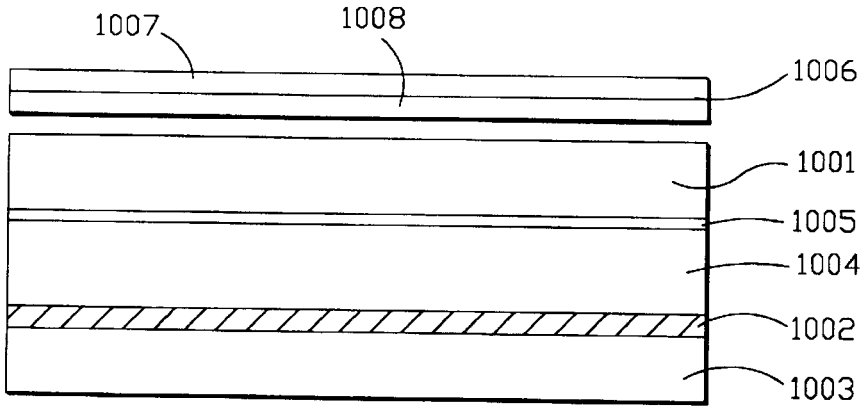
FIG. 10 is a cross section of the reflection-type device, according to a fifth embodiment of the present invention.

FIG. 10 is a cross section of a reflective-type LC device, according to a fifth embodiment of the present invention. It has a twisted nematic LC material layer 1004 that is sandwiched in between a transparent substrate 1001 and an opposing substrate 1003 on which is mounted a reflector 1002. A transparent electrode 1005 impresses an electric field on the LC layer 1004. Another electrode serves also doubles as the reflector 1002, and is a metal thin-film. The light input and light output surfaces are treated with a reflection-reducing coating to suppress spurious reflections. A circular polarizing plate 1006 has a phase plate 1008 attached to a linear polarizing plate 1007. In this polarizing element, a quarter wavelength plate is adhered to the LC side so that the azimuth of the index of refraction is shifted by 45°, with respect to the axis of transmission of the polarizing plate. Circularly-polarized light is then output. The azimuth of the index of refraction of the quarter wavelength plate can be perpendicular to the director of the LC. By arranging the principal optical axis on the side of LC layer 1004 facing quarter wavelength phase plate 1008, and the azimuth of the high index of refraction of the phase plate so they are perpendicular to each other, the advanced and late phases cancel each other out, thus compensating the reflection spectrum as indicated in FIG. 11, thereby enhancing the brightness of the device.

Figure 11:
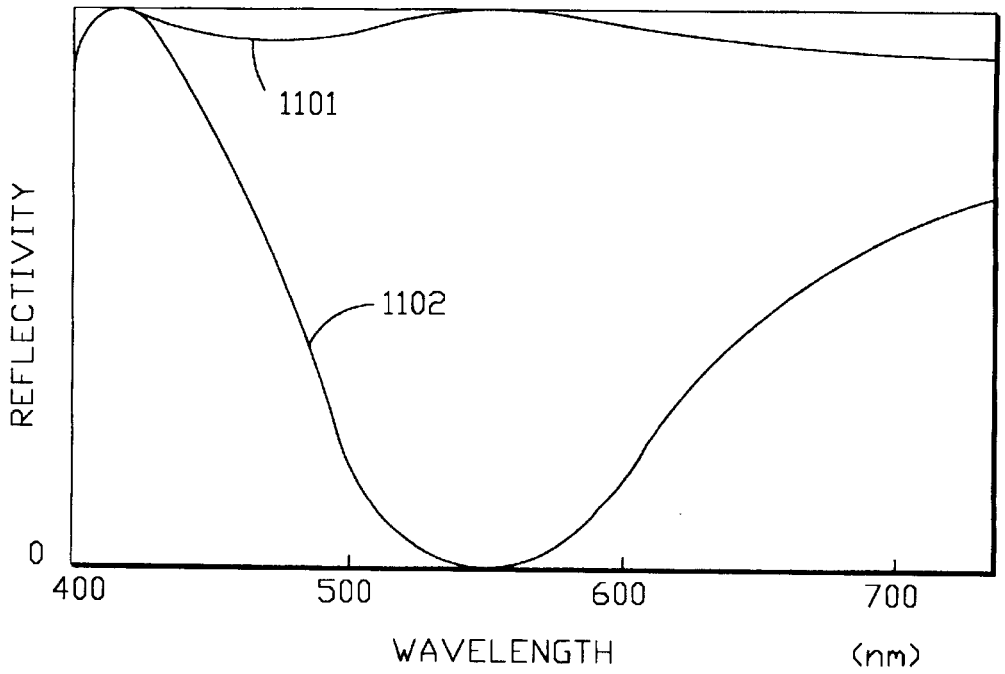
FIG. 11 is a graph of the reflection spectrum when OFF, for the device of FIG. 10.

FIG. 11 has a first reflection spectrum 1101 for the above device when it is OFF (given, $\Delta nd=0.57$ and the twist angle is 180°). A second reflection spectrum 1102 (for linearly-polarized light incident under the same LC conditions) is about the same as spectrum 1101, except that the polarizing plate angle is set to 83°. This behavior is opposite that of the first embodiment, with respect to reflectivity on the vertical axis. But when the device is OFF, the reflection spectrum is wider, in spite of the twist type.

Figure 12:
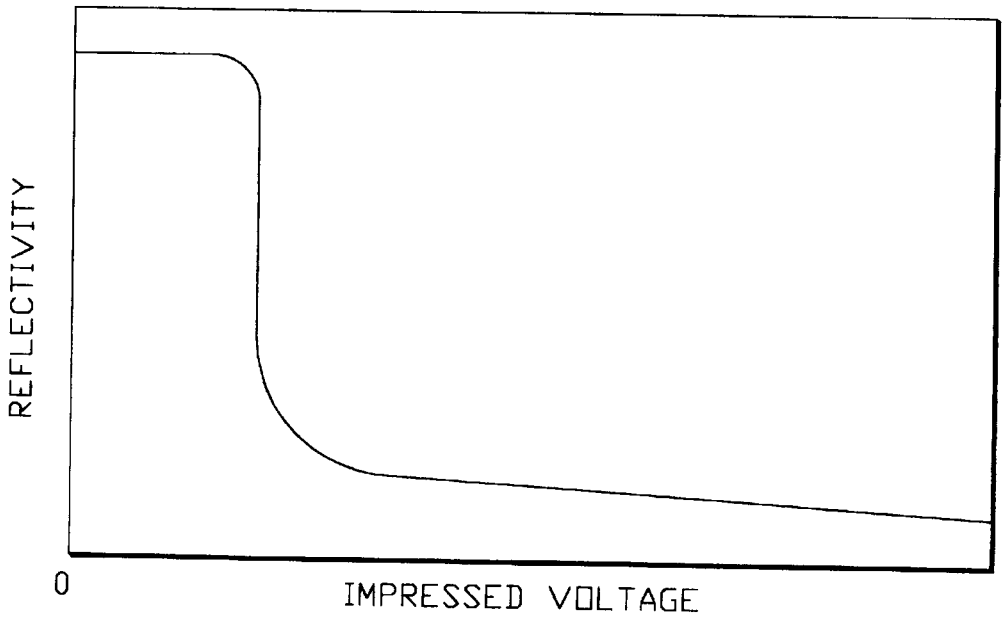
FIG. 12 is a graph depicting the impressed voltage-versus-reflectivity (550 nanometers) characteristic of the device of FIG. 10.

FIG. 12 is a voltage-versus-reflectivity (at 550 nanometers) characteristic for the device of FIG. 10. As in the first embodiment, the steepness of the voltage-transmissivity characteristic curve can be controlled by changing the twist angle.

Figure 13:
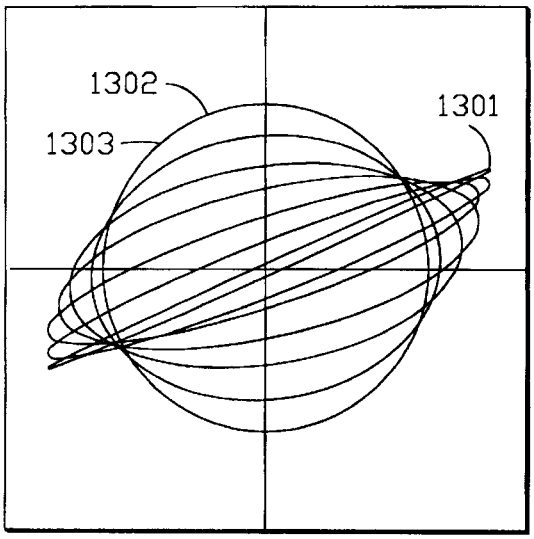
FIG. 13 is a diagram of the change in the LC layer when OFF, for the device of FIG. 10.

FIG. 13 shows a change in polarization in the LC layer when the above device is OFF. The simplest case is one in which the twist angle is 63°, $\Delta nd=0.2$ and the polarization angle is zero. Assuming that incident, circularly-polarized light 1302 enters the LC layer via the polarizing element when the voltage is zero. (Circularly-polarized light which is rotated to the right is assumed here.) The locus of the elliptically-polarized light changes, as shown, to a nearly linearly-polarized light 1301 at the reflective surface, and is then reflected back. As the light returns through the LC layer, it converts to circularly-polarized light 1303 (now rotated in the opposite direction, leftwise), and is provided as output. Since the direction of travel of the light has been reversed, the output light, which has passed through the quarter wavelength plate, converts to linearly-polarized light, and is able to pass through the linear polarizing plate. As a result, the device is clear in the OFF state.

Figure 14:
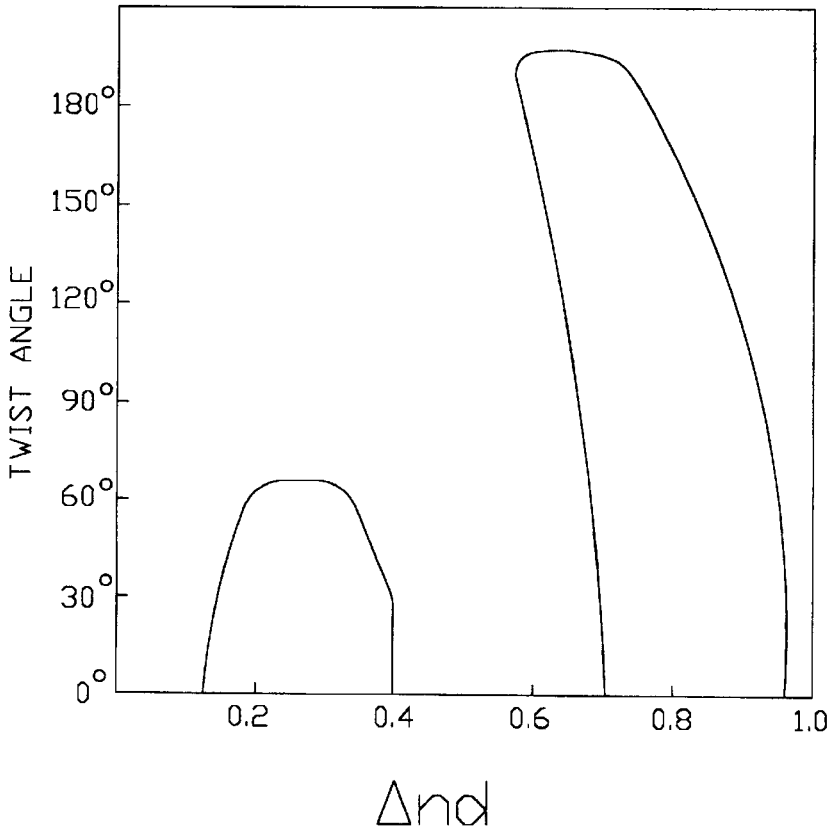
FIG. 14 is a graph showing the relationship between the twist angle versus Δnd.

When a voltage is applied, the molecules in the LC layer reorient in the direction of the electric field (due to the dielectric constant anisotropy of the LC material). Any birefringent anisotropy of the incident light vanishes, and incident, circularly-polarized light (rotated to the right) keeps its polarization as it is reflected back out. In the OFF state, the circularly-polarized light is converted to linearly-polarized light which is perpendicular to the quarter wavelength plate, and is blocked by the polarizing plate, thus reducing the reflectivity (ON state). This embodiment is opposite in its functioning to the first embodiment, with respect to the reflectivity about the vertical axis. Such changes in polarization are produced only under certain conditions, e.g., those depicted in FIG. 14, and are similar to FIG. 6B of the first embodiment.

Two optical characteristics required of the LC layer are that circularly-polarized light become linearly-polarized light with respect to its light input at the reflective surface after transmission and that circularly-polarized light be output that has the opposite rotation after transmission back through the LC layer. The circularly-polarized light and the linearly-polarized light have an orthogonal relationship to one another. Like the first embodiment, the present embodiment can be used as an optical shutter, because of its high reflectivity in the transparent state. It can also be used effectively in multiplexed display drive of XY matrix LCDs with many lines, by taking advantage of the steepness of the voltage-transmissivity characteristic curve which can be controlled via the twist angle. The reflection spectrum when the device is OFF has a characteristic opposite the first embodiment with respect to the reflectivity axis, but due to the compensation effect of the spectrum, a wider spectrum can be achieved. Further, since there is no specification regarding the polarizing plate angle, there is no need to match the angle in production.

Sixth Embodiment

Figure 15:
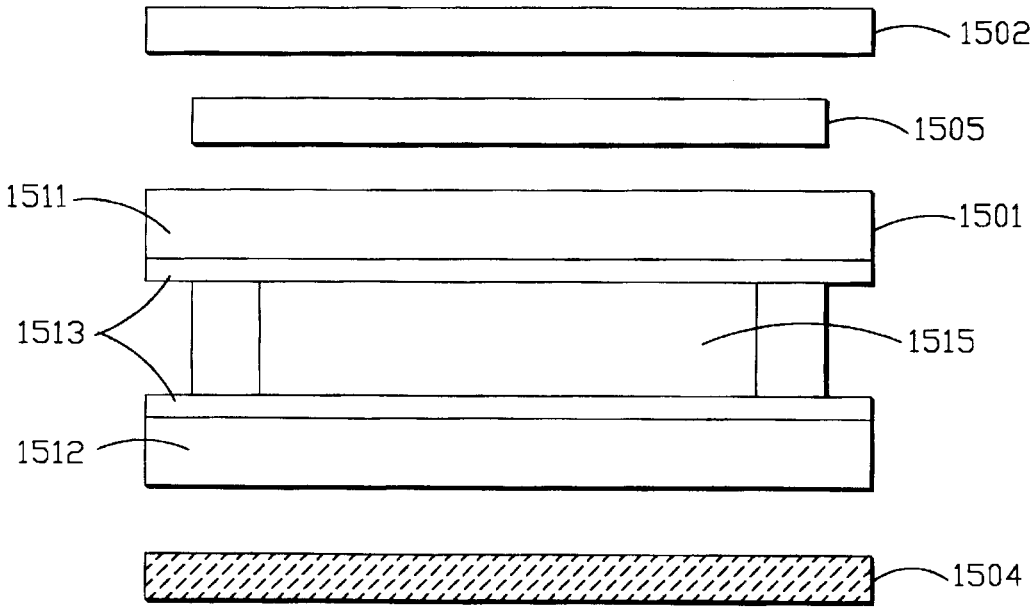
FIG. 15 is a cross section of the LC element in the sixth and seventh embodiments of the present invention.

FIG. 15 is a cross section of an LC device, according to a sixth embodiment of the present invention, comprising LC cell 1501, a polarizing plate 1502, a reflector 1504, an optically anisotropic material 1505, an upper substrate 1511, a lower substrate 1512, a transparent electrode 1513, and LC material 1515. The LC material used is preferably XLI-4506 ($\Delta n$=0.1438) from the Merck Company, and is twisted in LC cell 1501. The cell gap is 5.6 μm and the $\Delta nd$ is 0.81 μm. The optically anisotropic material is a uniaxially oriented film, made from a polycarbonate resin. It has an $\Delta n$ of 0.0039, a film thickness of 80 μm, and $\Delta nd$ is 0.31 μm.

Figure 16:
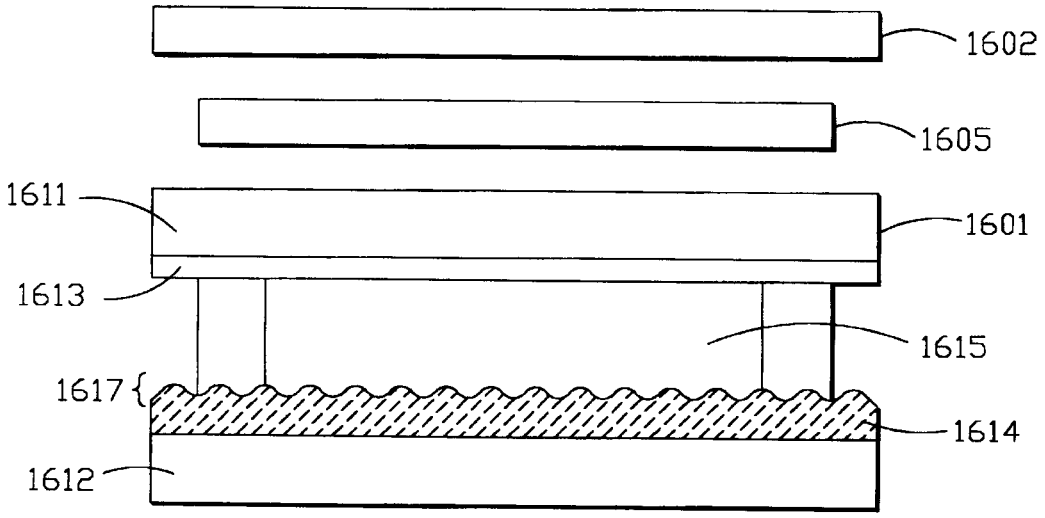
FIG. 16 is a cross section of the LC element in an eighth embodiment of the present invention.

FIG. 16 is discussed below, relative to the eighth embodiment.

Figure 17:
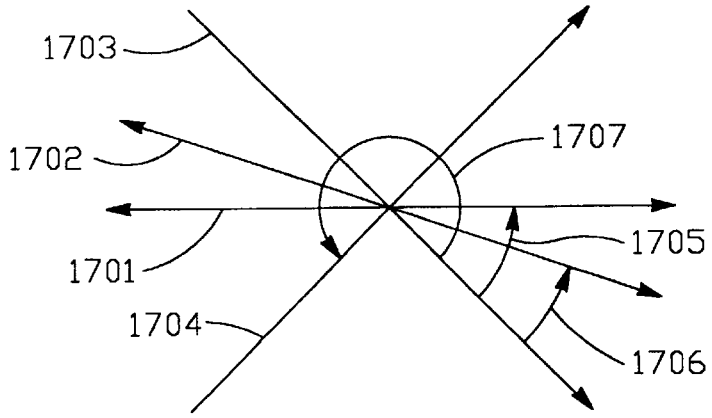
FIG. 17 is a diagram of the relationship between the various axes in the LC element.

FIG. 17 shows the relationship of each of the axes of the LC display elements, as seen from above in FIG. 15. A direction 1701 is the axis of polarization of polarizing plate 1502, a direction 1702 is the orientation of a uniaxially oriented film 1505 used for the optically anisotropic material, a direction 1703 is the rubbing direction of upper plate 1511, and a direction 1704 is the rubbing direction of lower plate 1512, angle 1705 is the angle formed between directions 1701 and 1703 and is equal to 40° (left), angle 1706 is formed between directions 1702 and 1703 and is 22° (left), and twist angle 1707 is 260° (left).

Figure 18:
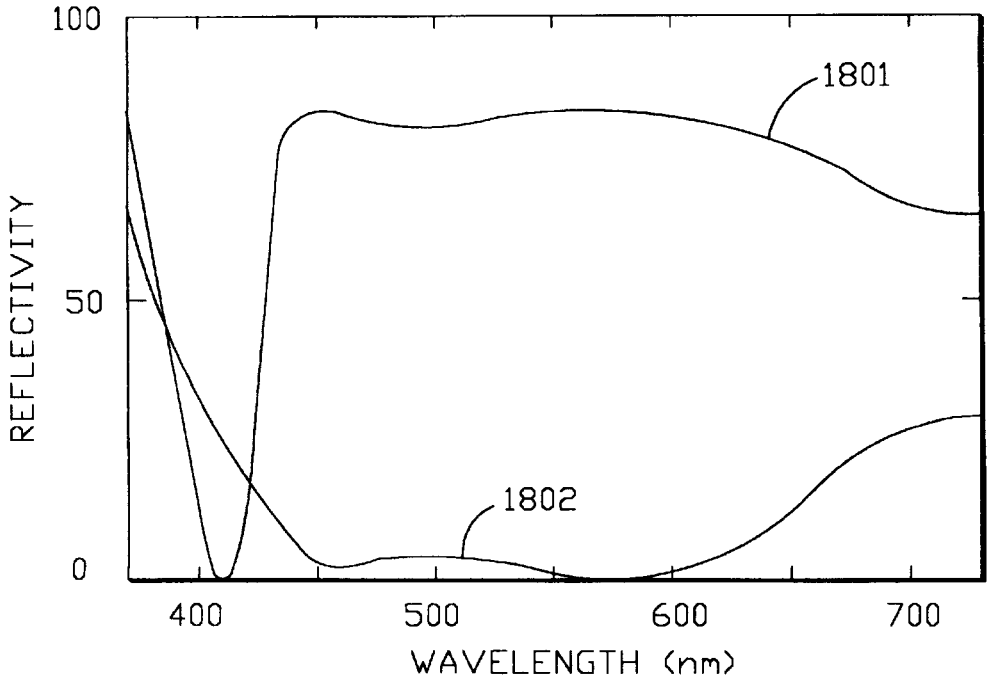
FIG. 18 is a graph showing the spectral characteristics when the electric field is OFF and ON in the LC display element in the sixth embodiment.

FIG. 18 shows the spectral characteristics of an LC display made under the above conditions. Spectral characteristics 1801 and 1802 correspond to when the electric field is OFF and ON. The luminous reflectivity $Y_{off}$ when the device is OFF is about 83%, and the display color is very close to being pure white. The luminous reflectivity when the device is ON is about 2.0%. Therefore the contrast ratio is 1:42, maximum. A contrast ratio of 1:20 is possible, since the LC display element has a large twist angle of 260° and the steepness of the voltage-transmissivity characteristic curve is extremely good, even when multiplexed display drive is being used with duty ratios as severe as 1/480.

Seventh Embodiment

Reference is again made to FIG. 15. An LC display element, according to a seventh embodiment of the present invention, is similar to the sixth embodiment, except that LC cell 1501 uses Merck Company LC ZLI-4428 ($\Delta n$=0.1222). The cell gap is preferably 6.0 μm and the value of $\Delta nd$ is about 0.73 μm. A uniaxially oriented film made from a PMMA resin is used for an optically anisotropic material 1505. The $\Delta n$ is 0.00061, film thickness 600 μm, and $\Delta nd$ is 0.37 μm.

In FIG. 17, angle 1705 is set at 21° (left), angle 1706 is set at 10° (left), and twist angle 1707 is set at 240° (left). A relatively high luminous reflectivity $Y_{off}$ of 78% is obtained when the device is OFF. The display color is very close to being pure white. The luminous reflectivity when the device is ON is about 2.1%, and so the maximum attainable contrast ratio is approximately 1:37. A uniaxially oriented film made from a PMMA resin with an optically negative orientation is used in this embodiment as the optically anisotropic material. The visual angle characteristics are excellent as a result.

Eighth Embodiment

FIG. 16 is a cross section of a LC display element, according to an eighth embodiment of the present invention, comprising an LC cell 1601, a polarizing plate 1602, an optically anisotropic material 1605, an upper substrate 1611, a lower substrate 1612, a transparent electrode 1613, a reflective film 1614, which also serves as a picture element electrode, and a liquid crystal (LC) material 1615. The LC material 1615 can be ZLI-4427 (having $\Delta n$=0.1127) from the Merck Company. The average $\Delta nd$ is 0.69 μm. Reflective film 1614 has a surface roughness 1617. Optically anisotropic material 1605 is preferably a uniaxially oriented film made from a polypropylene resin, for which the $\Delta n$ is 0.0018, the film thickness 200 μm, and $\Delta nd$ is 0.36. An angle 1705 (FIG. 17) value for this embodiment is 13° (left), an angle 1706 value is 88° (left) and a twist angle value is 225° (left). A relatively high luminous reflectivity $Y_{off}$ of 80% is obtained when the device is OFF. The display color is very close to being pure white. The reflectivity to light when the display is ON is a relatively low 2.2%. This yields a respectably high contrast ratio of 1:36, maximum.

Reflective film 1614 is preferably an aluminum thin-film which has been deposited by a sputtering method onto the surface of ground glass. The surface of the thin-film has a polish of about 0.5 μm, and it is able to reflect light with low sensitivity to directionality. Other metals, such as nickel, chrome, etc. that have a silver-white color, can be used with acceptable results. The surface can be smoothed with a metal or chemical treatment.

The reflective film can be patterned into combs or other figures by a direct method, or indirectly where a transparent electrode on the metal thin-film has an insulator between it and the transparent electrode to be patterned. Such an insulator has a desirable secondary effect of smoothing over the surface roughness, and that can be a big asset when the twist angle is very large and the d/p margin (d=cell gap, p=spontaneous pitch) is very narrow.

By positioning a reflector inside the LC cell, as above, the prior art problem of double images is eliminated. And, minute variations in the LC thickness have the beneficial effect of equalizing the display color and further decreasing any discoloration.

In the above embodiments, the optically anisotropic material is positioned between the LC cell and the polarizing plate, but it can also be positioned between the LC cell and the reflector. And, the optically anisotropic material is not limited to being only in one layer. A display with a higher contrast ratio and less coloration can be realized by using it two or more layers.

Wider viewing angles result when rubbing directions 1703 and 1704 are such that direction 1702 (of the uniaxially oriented film) is parallel to the horizontal surface of the display. The wider viewing angles make it convenient for several people at once to view a screen. Unfortunately, the contrast ratio is increased when direction 1702 is perpendicular to the display surface. So a tradeoff must be made. But either way, less expensive films that can be used, which substantially lowers production costs.

By using a semi-transparent reflector 1614 and a backlight on the side of the reflector opposite the LC cell, a transmission type display can be made for applications where there is not much ambient light. Reflection-type displays cannot be used under such low light conditions. To make tile transmission type display, a polarizing plate and, if necessary, an optically anisotropic material are put between the reflector and the backlight.

Several embodiments of the present invention are described above, but the present invention is not limited to these, and can be widely applied to reflection-type optical control devices.

While the present invention has been described in conjunction with several specific embodiments, it is evident to those skilled in the art that many further alternatives, modifications and variations will be apparent in light of the foregoing description. Thus, the present invention described herein is intended to embrace all such alternatives, modifications, applications and variations as may fall within the spirit and scope of the appended claims.

What is claimed is:

1. A reflection-type liquid crystal device comprising:

a liquid crystal cell including a pair of spaced apart opposed [transparent] substrates, a polarizing means disposed at a first side said liquid crystal cell, a reflecting means disposed at a second side of said liquid crystal cell, said liquid crystal cell comprising a twisted nematic liquid crystal layer having a twist angle and having a birefringence property, $\Delta n$, and having a thickness, d, for transforming the character of first linearly polarized light or first circularly polarized light propagating therethrough, respectively, into substantially circularly polarized light or substantially linearly polarized light incident at said reflecting means and transforming said substantially circularly polarized light or substantially linearly polarized light reflected from said reflecting means, respectively, into substantially second linearly polarized light or substantially second circularly polarized light having a polarization direction orthogonal with respect to a polarization direction of said first linearly polarized light or first circularly polarized light, respectively, said polarizing means characterized by having a polarization angle greater than zero wherein said polarization angle is an angle formed between a polarization axis of said polarizer and liquid crystal molecular director of said liquid crystal layer at a surface of said liquid crystal cell at said first side, and first and second optimized conditions for said twist angle relative to a given polarization angle and a product of $\Delta nd$, the first optimized condition comprising a twist angle range between about 0° and 65° with a $\Delta nd$ in a range between about 0.13 and 0.40, the second optimized condition comprising a twist angle range between about 0° and 200° with $\Delta nd$ in a range between about 0.53 and 0.97, said optimized conditions applicable for said given polarization angle plus or minus multiplies of approximately 90°.

2. The reflection-type liquid crystal device of claim 1 wherein light passing through said polarizing means prior to entering said liquid crystal layer is substantially first linearly polarized light and is converted by birefringence property of said liquid crystal layer to substantially circularly polarized light at said reflecting means, and said substantially circularly polarized light is reflected and is converted by birefringence property of said liquid crystal layer to substantially second linearly polarized light upon passing again through said liquid crystal layer, said first and second linearly polarized light having respective axes of polarization that are substantially orthogonal with one another.

3. The reflection-type liquid crystal device of claim 2 wherein said conversions transpire during an OFF state of said device.

4. The reflection-type liquid crystal device of claim 1 wherein light passing through said polarizing means prior to entering said liquid crystal layer is substantially first circularly polarized light and is converted by birefringence property of said liquid crystal layer to substantially linearly polarized light at said reflecting means, and said substantially linearly polarized light is reflected and converted by birefringence property of said liquid crystal layer to substantially second circularly polarized light upon passing again through said liquid crystal layer, said first and second circularly polarized light having opposite directions of rotation.

5. The reflection-type liquid crystal device of claim 4 wherein said conversions transpire during an OFF state of said device.

6. The reflection-type liquid crystal device of claim 4 further comprising a quarter wavelength plate having an optical axis in the plane of said plate and disposed between said polarizing means and said liquid crystal cell, said phase plate and polarizing means for producing said entering circularly polarized light, said liquid crystal molecular director substantially perpendicular to the optical axis of said phase plate.

7. The reflection-type liquid crystal device of claim 6 wherein said phase plate has an optical axis shifted by 45° with respect to an axis of light transmission of said polarizing means.

8. The reflection-type liquid crystal device of claim 6 wherein said phase plate is a quarter wavelength plate.

9. The reflection-type liquid crystal device of claim 1 further comprising:

an optically anisotropic element disposed between said liquid crystal cell and said polarizing means, said optically anisotropic element having an optical axis in the plane of said element, said liquid crystal molecular director of said liquid crystal layer and the optical axis of said optically anisotropic element arranged relative to one another to provide substantially white light during an OFF state of operation of said device.

10. The reflection-type liquid crystal device of claim 9 wherein an axis of said liquid crystal molecular director at said surface of said liquid crystal layer and the optical axis of said optically anisotropic element are substantially perpendicular.

11. The reflection-type liquid crystal device of claim 9 wherein second polarizing means and a second optically anisotropic element are disposed between said reflecting means and said liquid crystal cell, said reflecting means comprising a partially transparent reflector.

12. The reflection-type liquid crystal device of claim 9 wherein a second optically anisotropic element is disposed between said liquid crystal layer and said reflecting means.

13. The reflection-type liquid crystal device of claim 9 wherein said optically anisotropic element comprises a polycarbonate resin film, polypropylene resin film or a quarter wavelength plate.

14. The reflection-type liquid crystal device of claim 9 wherein said reflecting means has a roughened surface to provide light scattering.

15. The reflection-type liquid crystal device of claim 14 wherein said reflecting means is disposed on an inner surface of said substrate at said liquid crystal cell at said second side.

* * * * *

UNITED STATES PATENT AND TRADEMARK OFFICE

CERTIFICATE OF CORRECTION

| | | |
|---|---|---|
| PATENT NO. | : | RE35799 |
| DATED | : | May 19, 1998 |
| INVENTOR(S) | : | Tomio Sonehara, et al. |

It is certified that errors appear in the above identified patent and that said Letters Patent is hereby corrected as shown below:

Title page, item 64, Related U.S. Patent Documents, change "Appl. No.: 113,827" to --Appl. No.: 133,827--.

Title page, item 56, Other Publications, insert --Tomio Sonehara, "Photo-Addressed Liquid Crystal SLM with Twisted Nematic ECB (TN-ECB) Mode", Japanese Journal of Applied Physics, Vol. 29, No. 7, July 1990, pp. L1231-L1234.--

Signed and Sealed this

Tenth Day of November 1998

*Attest:*

Bruce Lehman

BRUCE LEHMAN

*Attesting Officer*

*Commissioner of Patents and Trademarks*